United States Patent [19]

Sakai et al.

[11] 3,910,965

[45] Oct. 7, 1975

[54] PROCESS FOR THE PREPARATION OF 2-FORMYLCYCLOPENTANE DERIVATIVES

[75] Inventors: Kiyoshi Sakai; Koichi Kojima; Takashi Yusa; Hamako Katano, all of Tokyo, Japan

[73] Assignee: Sankyo Company Limited, Tokyo, Japan

[22] Filed: Dec. 18, 1973

[21] Appl. No.: 425,886

Related U.S. Application Data

[62] Division of Ser. No. 309,971, Nov. 28, 1972, abandoned.

[30] Foreign Application Priority Data

Nov. 29, 1971  Japan.............................. 46-96039

[52] U.S. Cl. ........ 260/345.7; 260/345.8; 260/347.3; 260/347.4; 260/410; 260/464; 260/418 R; 260/468 D; 260/479 A; 260/488 K; 260/488 F; 260/488 CD; 260/514 R; 260/514 D; 260/551
[51] Int. Cl.²........................................ C07D 309/06
[58] Field of Search...................... 260/345.7, 345.8

[56] References Cited
UNITED STATES PATENTS
3,806,535   4/1974   Sakai et al. ...................... 260/345.7

OTHER PUBLICATIONS
Kojima et al., Tetrahedron Letters, No. 32, pp. 3333–3336, 1972.

*Primary Examiner*—Howard T. Mars
*Attorney, Agent, or Firm*—Flynn & Frishauf

[57] ABSTRACT

A process for the preparation of 2-formylcyclopentane derivatives having the formula

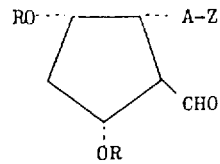

wherein A represents a straight or branched alkylene group having 1~8 carbon atoms, Z represents cyano group, carbamoyl group, carboxyl group or an alkoxycarbonyl group having 1~6 carbon atoms in the alkyl moiety and R represents a tetrahydropyranyl group or an alkoxyalkyl group having 1~6 carbon atoms in each alkyl moiety or its optical isomer or the racemic mixture thereof which comprises conntacting a 2-hydroxymethylcyclopentane derivative having the formula

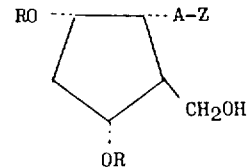

wherein A, Z and R are the same as above or its optical isomer or the racemic mixture thereof with an oxidizing agent in the presence of a solvent at the temperature ranging from −30°C to room temperature.

The 2-formylcyclopentane derivatives are useful as intermediates for synthesis of prostaglandin Fα.

3 Claims, No Drawings

PROCESS FOR THE PREPARATION OF 2-FORMYLCYCLOPENTANE DERIVATIVES

This is a division, of application Ser. No. 309,971, filed Nov. 28, 1972 and now abandoned.

This invention relates to a novel process for the preparation of 2-formylcyclopentane derivatives having the formula

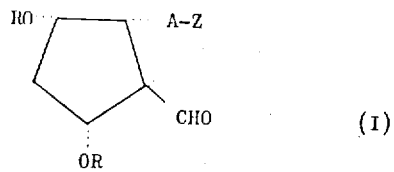

wherein A represents a straight or branched alkylene group having 1~8 carbon atoms, Z represents cyano group, carbamoyl group, carboxyl group or an alkoxycarbonyl group having 1~6 carbon atoms in the alkylmoiety and R represents a tetrahydropyranyl group or an alkoxy alkyl group having 1~6 carbon atoms in each alkyl moiety.

In the above formula (I), the group A may be methylene, ethylene, trimethylene, propylene, tetramethylene, 1, 2-butylene, 1, 3-butylene, pentamethylene, 1, 2-amylene, 2, 3-amylene, 1, 4-amylene, hexamethylene, heptamethylene and octamethylene, the group Z may be cyano, carbamoyl, methoxycarbonyl, ethoxycarbonyl, propoxycarbonyl, isopropoxycarbonyl, n-butoxycarbonyl, pentoxycarbonyl and hexoxycarbonyl and the group R may be 2-tetrahydropyranyl, 2-tetrahydrothiopyranyl, 4-methoxytetrahydropyranyl-4-yl, methoxy-methyl, ethoxymethyl, ethoxyethyl, propoxymethyl, isopropoxyethyl, α-methoxyethyl and α-ethoxyethyl.

A preferred group of compounds provided by the present invention are those of the formula (I) wherein A represents hexamethylene group and Z represents an alkoxycarbonyl group having 1~6 carbon atoms in the alkyl moiety, i.e., those having the formula

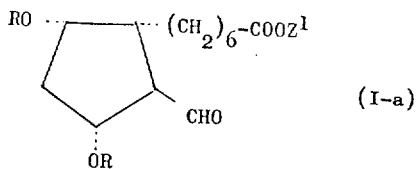

wherein R is the same as above Z¹ represents hydrogen atom or an alkyl group having 1~6 carbon atoms.

In the above formulae (I) and (I-a) and elsewhere in this specification, a bond attached to the cyclopentane nucleus which is in the α-configuration, i.e., extends below the plane of the cyclopentane ring, is represented by a dotted line, and a bond which is the β-configuration, i.e., extends above the plane of the cyclopentane ring, is represented by a solid line.

The cyclopentane derivatives having the above formulae (I) and (I-a) are useful as intermediates used in the manufacture of prostaglandin F1α having hypotensive and smooth muscle-stimulating activity and a process for the preparation of the compounds (I) and (I-a) have been described in German Patent "offenlegungsschrift" No. 2,044,698.

According to the prior process, the cyclopentane ring can be formed by oxidizing a bicycloheptane derivative prepared by a Diels-Alder reaction of cyclopentadiene with a diene compound.

The compounds (I), however, can not be stereospecifically produced in the prior process, that is, the compounds (I) are obtained as a mixture of stereochemical isomers regarding to the substituents in the 1-, 2-, 3- and 4- position of the cyclopentane ring.

It is an object of the present invention to provide a process for the preparation of the compounds (I) having the substituents of the sme configuration as prostaglandin F1α, i.e., having the substituents of trans configuration in the 1–2 position, trans configuration in the 2–3 position and cis configuration in the 3–4 position. Therefore, when the present process is employed as one of steps, there may be stereospecifically obtained prostaglandin F1α.

According to the process of the present invention, the compounds having the formula (I) or its optical isomer or the racemic mixture thereof may be prepared by contacting a compound having the formula

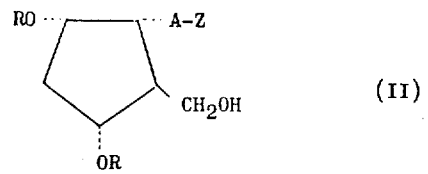

wherein A, Z and R are the same as above or its optical isomer or the racemic mixture thereof with an oxidizing agent in the presence of a solvent at the temperature ranging from −30°C to room temperature. In the process of this invention, when the optical isomer or the racemic mixture of the compound having the formula (II) are employed, there may be obtained the corresponding optical isomer or the racemic mixture of the compound having the formula (I).

As the oxidizing agent, there may be preferably employed chromic coupounds, e.g., chromic acid, chromic anhydride, chromic acid-pyridine complex, sodium bichromate, potassium bichromate; halogenoamides, e.g., N-bromoacetamide, N-chlorobenzenesulfornamide; halogenoimides, e.g., N-bromosuccinimide, N-bromophthalimide; aluminum alkoxides, e.g., aluminum tert-butoxide, aluminum isopropoxide; dimethyl sulfoxide-dicyclohexylcarbodiimide; and dimethyl sulfoxide-acetic anhydride. As the solvent, there may be employed any solvent without limitation that would have an effect on the reaction, but a preferable solvent is different depending upon the oxidizing agent. When chromic acids are employed, there may be preferably employed carboxylic acids, e.g., acetic acid, a mixture of a carboxylic acid and a carboxylic acid anhydride, e.g., acetic acid-acetic anhydride; hydrocarbon halide, e.g., methylene chloride, chloroform and carbon tetrachloride. When organic active halides are employed, there may be preferably employed an aqueous organic solvent, for example, aqueous tert-butanol, aqueous acetone and aqueous pyridine. When aluminum alkoxides are employed, there may be preferably employed aromatic hydrocarbons, for example, benzene, toluene and xylene. In this case, it is preferable to employ, as a hydrogen acceptor, an excess amount of ketones, for example, acetone, methyl ethyl ketone, cyclohexanone and it is necessary to remove water completely from the reaction system. When dimethyl sulfoxide-dicyclohexylcarbodiimide or dimethyl sulfoxide-acetic anhydride is employed, there may be preferably employed an excess amount of the dimethyl sulfoxide without employment of other solvents. When dimethyl sulfoxide-dicyclocarbodiimide is employed, there is employed, as usual, a catalytic amount of acids, e.g., phosphoric acid, acetic acid, trifluoroacetic acid. As the oxidizing agent, there may be most preferably employed chromic compounds, especially chromic acid-pyridine complex. The reaction temperature is not critical, but it is desirable to carry out the reaction at low temperatures in order to control side reactions. It is preferably from −30°C to room temperature, most preferably from 0°C to room temperature. The reaction period will depend mainly upon the reaction temperature and a kind of the oxidizing agent and may vary from several minutes to 1 hour.

After completion of the reaction, the desired product may be recovered from the reaction mixture by a conventional means, for example, by removal of a solvent from the reaction mixture. The product thus obtained may be, if necessary, further purified by a conventional means, for example, column chromatography or thin-layer chromatography.

The compounds having the above formula (II), employed as starting materials, are novel and can be prepared by the process shown in the following reaction schema.

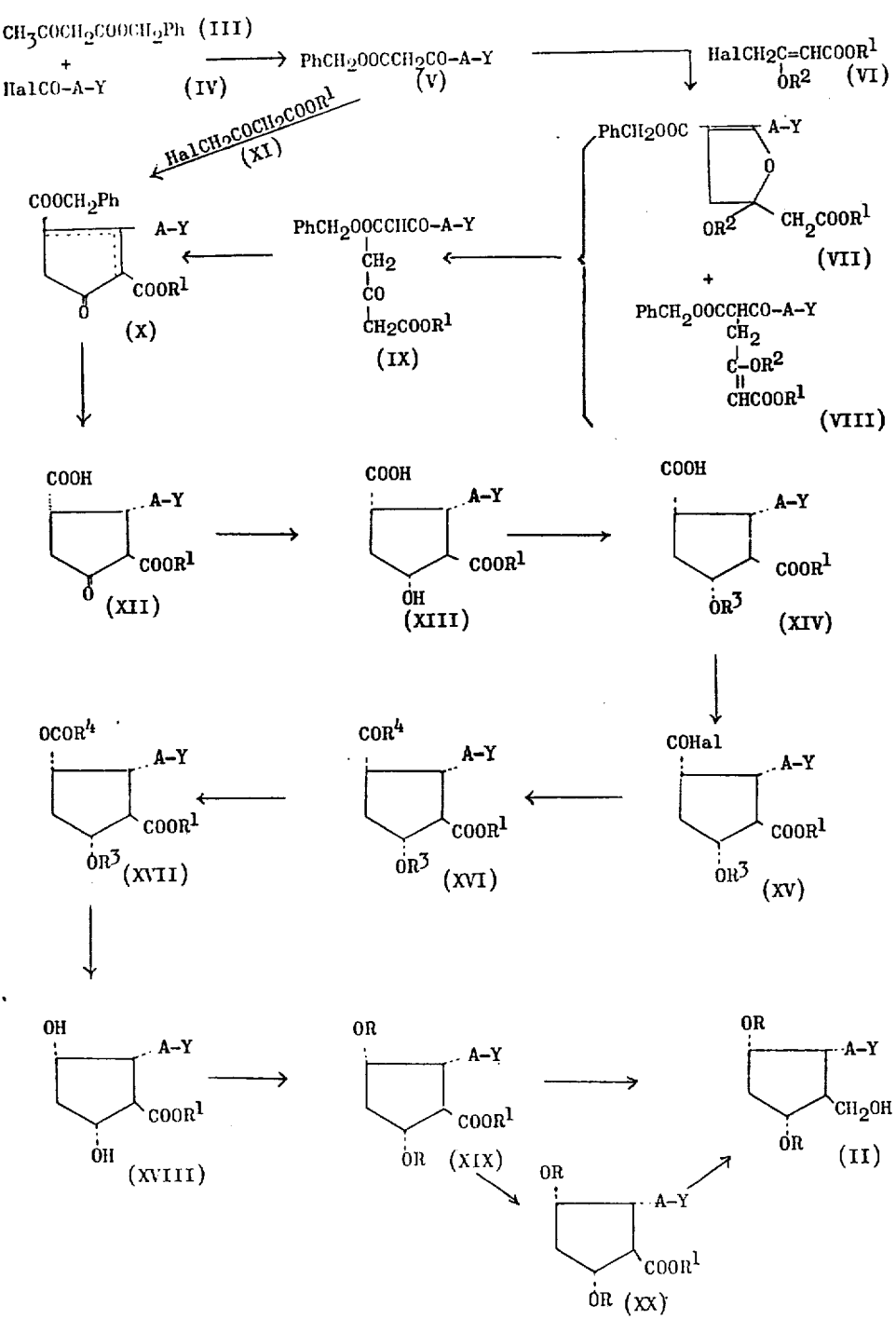

In the above formulae, A, Z and R are the same above, Y represents cyano/group, carbamoyl group or an alkoxycarbonyl group having 1~6 carbon atoms in the alkyl moiety, $R^1$, $R^2$ and $R^4$ may be the same or different and each represents an alkyl group having 1~6 carbon atoms, $R^3$ represents an acyl group of a hydrocarbon carboxylic acid containing 1~12 carbon atoms, Ph. represents phenyl group, Hal represents a halogen atom such as chlorine and bromine and the formula

represents the formula

or

or a mixture thereof.

Each of the above steps will be illustrated as follows;

The compound (V) may be prepared by contacting the compound (III) with the compound (IV) in the presence of a base.

Examples of the base include alkali metals e.g., metallic sodium; metal hydrides e.g., sodium hydride; and thallium compounds, e.g., thallium hydroxide, methoxythallium. The reaction is usually carried out in the presence of a solvent. As the solvent, there may be employed any solvent without limitation that would not have an effect on the reaction.

Examples of such a solvent include hydrocarbons, e.g., benzene, toluene and ethers, e.g., diethyl ether, tetrahydrofuran, dioxane. These solvents are preferably employed, especially in anhydrous condition. The reaction temperature is not critical, but it is preferably from −10° to 40°C. The reaction period will depend mainly upon the reaction temperature and a kind of the base employed and may vary from 30 minutes to 15 hours.

The compound (VII) or the compound (VIII) or a mixture thereof may be prepared by contacting the compound (V) with the compound (VI) in the presence of a base. As the base, there may be preferably employed a strong base such as alkali metals, e.g., metallic sodium; alkali metal hydroxides, e.g., sodium hydroxide, potassium hydroxide; alkali metal hydrides, e.g., sodium hydride; alkali metal alkoxides, e.g., sodium tert-butoxide, potassium tert-butoxide, sodium methoxide, potassium ethoxide; alkali metal amides, e.g., sodium amide, potassium amide; and metal salts of dialkyl sulfoxide, e.g., sodium- or potassium salt of dimethyl sulfoxide. The reaction is usually carried out in the presence of a solvent. As the solvent, there may be employed any inert organic solvent without limitation that would not have an effect on the reaction. Examples of such a solvent include hydrocarbons, e.g., benzene, toluene, cyclohexane; ethers, e.g., diethyl ether, dimethoxy ethane, dioxane, tetrahydrofuran; dialkylformamide, e.g., dimethylformamide; and dialkyl sulfoxide, e.g., dimethyl sulfoxide.

The reaction temperature is not critical and it is usually from at room temperature to a reflux temperature of a solvent employed. The reaction period will depend mainly upon the reaction temperature and a kind of the base and may vary from about 2 hours to 24 hours.

The compound (IX) may be prepared by contacting the compound (VII), the compound (VIII) or a mixture thereof with an acid. As the acid, there may be preferably employed an organic strong acid such as trifluoroacetic acid, monochloroacetic acid, dichloroacetic acid, trichloroacetic acid, benzenesulfonic acid and p-toluenesulfonic acid and a mineral acid such as hydrochloric acid, sulfuric acid and phosphoric acid. The reaction may be carried out in the presence or absence of a solvent, but it is preferable to employ a solvent in order to proceed the reaction smoothly. As the solvent, there may be any solvent without limitation that would not have an effect on the reaction. Examples of such a solvent include hydrocarbons, e.g., benzene, toluene, cyclohexane; ethers, e.g., diethyl ether, dimethoxy ethane, dioxane, tetrahydrofuran; dialkylformamides, e.g., dimethylformamide; dialkyl sulfoxides, e.g., dimethyl sulfoxide; halogeno hydrocarbon, e.g., dichloromethane, trichloromethane, carbon tetra-chloride; and esters, e.g., ethyl acetate. The reaction temperature is not critical, but it is usually from −10°C to room temperature. The reaction period will depend mainly upon the reaction temperature and a kind of the acid and may vary usually from 1 hour to 10 hours.

The compound (X) may be prepared by contacting the compound (IX) with a base. Examples of the base include alkali- or alkaline earth metal hydroxides, e.g., sodium hydroxide, potassium hydroxide, calcium hydroxide, barium hydroxide; alkali- or alkaline earth metals, e.g., metallic sodium, -potassium, -calcium, -barium; alkali metal carbonates, e.g., sodium carbonate, potassium carbonate, alkali metal bicarbonates, e.g., sodium bicarbonate, potassium bicarbonate; alkali- or alkaline earth metal acetates, e.g., sodium acetate, potassium acetate, calcium acetate; alkali- or alkaline earth metal alkoxides, e.g., sodium methoxides, potassium ethoxide, calcium ethoxide; and alkali metal fluorides, e.g., sodium fluoride, potassium fluoride. The reaction is usually carried out in the presence of a solvent. As the solvent, there may be employed without limitation that would not have an effect on the reaction. Examples of such a solvent include ethers, e.g., diethyl ether, dimethoxy-ethane, dioxane, tetrahydrofuran; hydrocarbons, e.g., benzene, toluene, cyclohexane; and alcohols, e.g., methanol, ethanol, ethylene glycol. The reaction temperature is not critical, but the reaction may be preferably carried out at from −10°C. to 50°C. The reaction period will depend mainly upon the reaction temperature and a kind of the base employed and may vary from about 30 minutes to 10 hours.

Alternatively, the compound (X) may be prepared by contacting the compound (V) with the compound (XI) in the presence of a strong base. Examples of the base include alkali metals, e.g., metallic sodium, alkali metal hydroxides, e.g., sodium hydroxide, potassium hydroxide; alkali metal hydrides, e.g., sodium hydride; alkali metal alkoxide, e.g., sodium tert-butoxide, potassium tert-butoxide, sodium methoxide, potassium ethoxide; alkali metal amides, e.g., sodium amide, potassium amide; and alkali metal salts of dialkyl sulfoxide, e.g., sodium - or potassium salt of dimethyl sulfoxide. The reaction is preferably carried out in the presence of a solvent. As the solvent, there may be employed any inert organic solvent without limitation that would not have an effect on the reaction. Examples of such a solvent include hydrocarbons, e.g., benzene, toluene, cyclohexane; ethers, e.g., diethyl ether, dimethoxymethane, dioxane, tetrahydrofuran; dialkylformamides, e.g., dimethylformamide; and dialkyl sulfoxide, e.g., dimethyl sulfoxide. The reaction temperature is not critical, but the reaction may be preferably carried out at the temperature ranging from 0° to 50°C. The reaction period will depend mainly upon the reaction temperature and a kind of the base employed and may vary from 1 hour to 10 hours.

The compound (XII) may be prepared by subjecting the compound (X) to catalytic reduction in the presence of a solvent.

As the catalyst which may be used in the reaction, there may be preferably employed palladium catalyst such as palladium black, palladium oxide, colloidal palladium, anhydrous colloidal palladium, palladium-barium sulfate, palladium on charcoal, palladium on barium - or strontium carbonate and palladium on silica gel; rhodium catalyst such as rhodium asbestos and colloidal rhodium; iridium catalyst such as iridium asbestos and colloidal iridium; nickel catalyst such as reduced nickel catalyst, nickel oxide catalyst, Raney nickel catalyst, Urushibara nickel catalyst and nickel boride catalyst; cobalt catalyst such as Raney cobalt catalyst, reduced cobalt catalyst and Urushibara cobalt catalyst; iron catalyst such as reduced iron catalyst and Raney iron catalyst; copper catalyst such as reduced copper catalyst, copper on carrier and Raney copper catalyst. As the solvent, there may be employed any solvent without limitation that would not have an effect on the reaction. Preferable examples of such a solvent include water; alcohols, e.g., methanol, ethanol and ethylene glycol; ethers, e.g., diethyl ether, dioxane and tetrahydrofuran; hydrocarbons, e.g., benzene, toluene, cyclohexane and methylcyclohexane; esters, e.g., acetate; and carboxylic acids, e.g., acetic acid. The reaction may be carried out under ordinary pressure or increasing pressure. The reaction temperature is not critical, but the reaction is preferably carried out at from 0°C to room temperature. The reaction ends when the absorption of hydrogen gas ceases. On the present reaction, there may be stereospecifically obtained the cyclopentane derivative (XII) having substituents of trans configuration in the 2-3 position and cis configuration in the 3-4 position.

The compound (XIII) may be prepared by reducing the compound (XII). The reduction may be preferably carried out by contacting the compound (XII) with a metal hydride in the presence of a solvent or by subjecting the compound (XII) to catalytic reduction. As the metal hydride complex, there may be preferably employed an alkali metal hydride complex, for example, sodium boron hydride, potassium boron hydride, lithium boron hydride and an aluminum hydride complex, for example, aluminum trimethoxylithium hydride, aluminum tri-tert-butoxylithium hydride. It is desirable to employ an excess amount of the metal hydride complex. As the solvent, there may be employed any inert organic solvent without limitation that would not have an effect on the reaction.

Preferable examples of such a solvent include alcohols, e.g., methanol, ethanol, tert-butanol; ethers, e.g., diethyl ether, dioxane, tetrahydrofuran, diglyme; dialkylformamides, e.g., dimethylformamide. The reaction temperature is not critical, but it is preferable to carry out the reaction at low temperatures in order to control side reactions, preferably at the temperatures ranging from −10°C to room temperature. The reaction period will depend mainly upon the reaction and a kind of the metal hydride and may vary from several minutes to 1 hour.

When the reduction is carried out by catalytic reduction, there may be preferably employed, as the catalyst, platinum catalyst, e.g., platinum wire, platinum plate, platinum black, spongy platinum, platinum oxide, colloidal platinum. The catalytic reduction is usually carried out in the presence of a solvent. As the solvent, there may be employed any solvent without limitation that would not have an effect on the reaction.

Preferable examples of such a solvent include water; alcohols, e.g., methanol, ethanol, ethylene glycol; ethers, e.g., diethyl ether, dioxane, tetrahydrofuran, diglyme; hydrocarbons, e.g., benzene, toluene, cyclohexane, methylcyclohexane; esters, e.g., ethyl acetate; carboxylic acids, e.g., acetic acid; and dialkyl-formamides, e.g., dimethylformamide. The reaction may be carried out under ordinary pressure or increasing pressure. The reaction temperature is not critical but the reaction is preferably carried out at low temperature in order to control side reactions, preferably at room temperature. The reaction ends when the absorption of hydrogen gas ceases. In the present reaction there may be stereospecifically obtained the cyclopentane derivative (XIII) having the substituents of trans configuration in the 1 − 2 position, trans configuration in the 2 − 3 position and cis configuration in the 3 − 4 position.

The compound (XIV) may be prepared by contacting the compound (XIII) with a hydrogen carboxylic acid or a halide or anhydride thereof. The reaction may be carried out in the presence or absence of a solvent. Examples of the carboxylic acid or the halide or anhydride include acetic acid, propionic acid, benzoic acid, the chloride, bromide or anhydride of such an acid. Preferably examples of a solvent include amines, e.g., pyridine, triethylamine; halogeno-hydrocarbons, e.g., chloroform, dichloromethane; ethers, e.g., diethyl ether, tetrahydrofuran, dioxane; hydrocarbons, e.g., benzene, toluen; ethers, e.g., ethyl acetate. The reaction temperature is not critical, but preferably the reaction may be carried out at the temperature ranging from 0°C to room temperature. The reaction period depends mainly upon the reaction temperature and a kind of the reagent and may vary from about 1 hour to 24 hours.

The compound (XV) may be prepared by contacting the compound (XIV) with a halogenating agent. As the halogenating agent, there may be employed dicarboxylic halides, e.g., oxalyl chloride, oxalyl bromide, maloyl chloride, succinyl chloride; phosphorus halides, e.g., phosphorus oxychloride, phosphorus oxybromide, phosphorus trichloride, phosphorus tribromide, phosphorus pentachloride, phosphorus pentabromide; thionyl halides, e.g., thionyl chloride, thionyl bromide; a mixture of triarylphosphine and carbon tetrahalide, e.g., a mixture of triphenylphosphin and carbon tetrachloride. As a solvent, there may be preferably employed an inert organic solvent such as etheres, e.g., diethyl ether, dioxane, tetrahydrofuran; hydrocarbons, e.g., benzene, toluene. The reaction temperature is not critical and usually the reaction may be carried out at from 0°C to room temperature. The reaction period will depend mainly upon the reaction temperature and a kind of the halogenating agent and may vary from about 30 minutes to 5 hours.

The compound (XVI) may be prepared by contacting compound (XV) with an alkylating agent. As the alkylating agent, there may be employed alkyl metal compounds such as dialkylcopperlithium, e.g., dimethylcopper lithium, diethylcopperlithium; a dialkylcadmium, e.g., dimethylcadmium, diethylcadmium; an alkyllithium, e.g., ethyllithium; a Grignard reagent, e.g., methylmagnesium bromide, ethylmagnesium iodide. The reaction is carried out in the presence of a solvent. As the solvent, there may be employed an inert organic solvent without limitation that would not have an effect on the reaction. Preferably examples of such a solvent include ethers, e.g., diethyl ether, dimethoxyethane, dioxane, tetrahydrofuran; hydrocarbons, e.g., benzene, toluene. The reaction temperature is not critical. In case of employing the dialkylcopperlithium, the alkyllithium or the Grignard reagent, the reaction is desirably carried out at relatively low temperature, preferably at the temperature ranging from −80°C to room temperature, in order to control side reactions. The reaction period will depend mainly upon the reaction temperature and a kind of the alkylating agent and may vary from about 5 minutes to 10 hours.

In case of employing the dialkylcadmium as the reagent, the reaction is carried out at relatively high temperatures, usually at the temperature ranging from room temperature to a reflux temperature of the solvent employed. The reaction period will depend mainly upon the reaction temperature and may vary from about 30 minutes to 5 hours.

The compound (XVII) may be prepared by contacting the compound (XVI) with peroxides. As the peroxides, there may be preferably employed organic peroxides, for example, performic acid, peracetic acid, perpropionic acid, perlauric acid, percamphoric acid, pertrifluoroacetic acid, perbenzoic acid, m-chloroperbenzoic acid and monoperphthalic acid and hydrogen peroxide. The reaction may be carried out in the presence or absence of a solvent. It is preferable to employ a solvent in order to proceed the reaction smoothly. As a solvent, there may be employed any solvent without limitation that would not have an effect on the reaction. Preferable examples of such a solvent include halogenohydrocarbons, e.g., chloroform, dichloroethane; ethers, e.g., dioxane, tetrahydrofuran; esters, e.g., ethyl acetate. The reaction temperature is not critical, but the reaction is desirably carried out at low temperatures, preferably at the temperature ranging from −10°C to room temperature, in order to control side reactions. The reaction period will depend mainly upon the reaction temperature and a kind of the peroxides and may vary from about 10 minutes to 10 hours.

The compound (XVIII) may be prepared by contacting the compound (XVII) with a base. As the base, there may be employed alkali - or alkaline earth metal hydroxides, e.g., sodium hydroxide, potassium hydroxide, calcium hydroxide; alkali metal carbonates, e.g., sodium carbonate, potassium carbonate; alkali metal bicarbonate, e.g., sodium bicarbonate, potassium bicarbonate; alkali — or alkaline earth metal alkoxides, e.g., sodium methoxide, potassium ethoxide, calcium ethoxide; organic amines, e.g., trimethylamine, triethylamine, pyridine, piperidine. The reaction is preferably carried out in the presence of a solvent. As the solvent, there may be employed water; alcohols, e.g., methanol, ethanol; ethers, e.g., dioxane, tetrahydrofuran; dialkylformamide, e.g., dimethylformamide; dialkyl sulfoxides, e.g., dimethyl sulfoxide; and a mixture of water and such an organic solvent. The reaction temperature is not critical, but the reaction may be preferably carried out at the temperature ranging from room temperature to 70°C. The reaction period will depend mainly upon the reaction temperature and a kind of the base employed and may vary from about 30 minutes to 3 hours.

The compound (XIX) may be prepared by contacting the compound (XVIII) with tetrahydropyran or alkoxyalkyl halides. When the tetrahydropyrans are employed as a reactant, the reaction is carried out in the presence of a small amount of acids. Examples of the tetrahydropyrans include tetrahydropyran, tetrahydrothiopyran, 4-methoxytetrahydropyran.

As the acids, there may be employed a mineral acid, for example, acid, e.g., hydrochloric acid, hydrobromic acid an organic acid, for example, picric acid, trifluoroacetic acid, benzenesulfonic acid, p-toluenesulfonic acid. The reaction may be carried out in the presence or absence of a solvent. It is preferable to employ a solvent in order to proceed the reaction smoothly. As the solvent, there may be employed any inert organic solvent without limitation that would not have an effect on the reaction. Examples of such a solvent include halogenohydrocarbons, e.g., chloroform, dichloromethane and nitriles, e.g., acetonitrile.

When the alkoxyalkyl halides are employed as a reactant, the reaction is carried out in the presence of a base. As the base, there may be employed alkali metal hydrides, e.g., sodium hydride, potassium hydride, lithium hydride, alkali metal amides, e.g., sodium amide, potassium amide, alkali metal alkoxides, e.g., sodium methoxide, potassium ethoxide and dialkylsulfoxide metal salt, e.g., dimethylsulfoxide sodium salt, dimethylsulfoxide potassium salt.

The reaction may be carried out in the presence or absence of a solvent. It is preferable to employ a solvent in order to proceed the reaction smoothly. As the solvent, there may be employed any inert organic solvent without limitation that would not have an effect on the reaction. Examples of such a solvent include ethers, e.g., tetrahydrofuran, dioxane, diethyl ether; hydrocarbons, e.g., benzene, toluene, cyclohexane; dialkylformamide, e.g., dimethylformamide; and dialkylsulfoxide, e.g., dimethyl sulfoxide. The reaction temperature is not critical, but the reaction may be preferably carried out at the temperature ranging from 0°C to room temperature. The reaction period will depend mainly upon the reaction temperature and a kind of the reactant and may vary from about one hour to 24 hours.

The compound (XX) may be prepared by contacting the compound (XIX) with a base. As the base, there may be preferably employed alkali — or alkaline earth metal hydroxides, e.g., sodium hydroxide, potassium hydroxide, calcium hydroxide; alkali metal carbonates, e.g., sodium carbonate, potassium carbonate; alkali metal bicarbonate, e.g., sodium bicarbonate, potassium bicarbonate; alkali — or alkaline earth metal alkoxides, e.g., sodium methoxide, potassium ethoxide, calcium ethoxide. The reaction is preferably carried out in the presence of a solvent. As the solvent, there may be employed water alcohols, e.g., methanol, ethano; ethers, e.g., dioxane, tetrahydrofuran; dialkylformamides, e.g., demethylformamide; dialkyl sulfoxides, e.g., dimethyl sulfoxide; and a mixture of water and such an organic solvent. The reaction temperature is not critical, but the reaction may be preferably carried out at the temperature ranging from room temperature to reflux temperature of the solvent employed. The reaction period will depend mainly upon the reaction temperature and a kind of the base employed and may vary from about 30 minutes to 10 hours.

The compound (II) may be prepared by reducing the compound (XIX) or (XX) with a reducing agent. As the reducing agent, there may be employed metal hydride complex, for example, sodium boron hydride, potassium boron hydride, lithium boron hydride, lithium aluminum hydride and tri-tert-butoxy lithium aluminum. The reaction is preferably carried out in the presence of a solvent. As the solvent, there may be employed an inert organic solvent without limitation that would not have an effect on the reaction. Examples of such a solvent include alcohols, e.g., methanol, ethanol; ethers, e.g., tetrahydrofuran, dioxane. The reaction temperature is not critical, but the reaction is preferably carried out at the temperature ranging from 0°C to reflux temperature of the solvent employed. The reaction period will depend mainly upon the reaction temperature and a kind of the reductant and may vary from about 5 hours to 10 hours.

In the process mentioned above the compound (XII) and the subsequent products can be produced as racemic mixtures and the racemic mixtures can be resolved at appropriate stages by methods will known in the art, whereupon subsequent products may be obtained as the corresponding optically pure isomes. In the above schema both the optical isomer and the racemic forms are depicted by a single representation. But, it should not be considered to limit the scope of the disclosure.

Prostaglandin F1α, i.e., 9α, 11α, 15α-trihydroxyprost-13(trans)-enoic acid can be prepared from the cyclopentane derivatives (I) of the present invention by a known method. For instance, prostaglandin F1α can be prepared by reacting the compound (I) with a Wittig reagent, e.g., tri-n-butylphosphin-2-oxoheptylide, reducing the product with an alkali metal boron hydride, e.g., sodium boron hydride and next hydrolyzing the product with an acid, e.g., acetic acid and, if desired, subsequently with an alkali, e.g., potassium hydroxide. On each step mentioned above, the reaction product may be recovered from the reaction mixture and purified by conventional means, for example, column chromatography and thin-layer chromatography. The following preparations and example are given for the purpose of illustration of this invention.

PREPARATION 1

Benzyl 3-oxo-9-ethoxycarbonylnonanoate (V)

To 250 ml. of anhydrous ether is added 3.76 g. of granulated metallic sodium and to the mixture is added dropwise 32 g. of benzyl acetoacetate under ice-cooling and stirring over one hour. After completion of the addition, the mixture is further stirred at room temperature for 4 hours. To the mixture is added dropwise 31 g. of 1-ethoxycarbonylheptanoyl chloride little by little under ice-cooling. After completion of the addition, the mixture is stirred at room temperature for 12 hours and subsequently refluxed for 30 minutes. After completion of the reaction, ice water is added to the reaction mixture under ice-cooling. The ether layer is separated, washed successively with 5 percent sulfuric acid and water and dried over anhydrous sodium sulfate. The ether is distilled off from the ether solution to give oils. The oils are again dissolved in 450 ml. of anhydrous ether and into the solution is passed ammonia gas for 30 minutes under ice-cooling and subsequently for 2 hours at room temperature. Argon gas is passed into the reaction mixture in order to put out the ammonia gas dissolved in the reaction mixture. The ether layer is washed successively with a 3N-hydrochloric acid solution and water and dried over anhydrous sodium sulfate. The ether is distilled off from the ether solution. The oily residues are subjected to vacuum distillation and the fraction distilled at 180°C (bath temperature)/0.1~0.2 mmHg are removed. The oily residues are subjected to chromatography using neutral alumina (Grade III Woelm co.) and eluted successively with some amount of hexane~a hexane solution containing 10 percent benzene and next successively with a hexane solution containing 20~40 percent benzene. The eluates with the hexane solution containing 20~40 percent benzene are collected and the solvent is distilled off to give 13.3 g. of the oily desired product.

I.R. (liquid film) ν max$^{cm^{-1}}$ : 745, 1700, 1740
N.M.R. (CDCl$_3$) τ : ppm
2.61 (5H, singlet, C$_6$H$_5$-)

4.80 (2H, singlet, —CH$_2$OCO—)

5.83 (2H, quartette, CH$_3$CH$_2$OCO-)

6.51 (2H, singlet, —CH$_2$OCOCH$_2$CO—)

8.75 (3H, triplet, CH$_3$CH$_2$OCO-)

PREPARATION 2

2-Methoxy-2-methoxycarbonylmethyl-4-benzyloxycarbonyl-5-(6-ethoxycarbonylhexyl)-2,5-dihydrofuran (VII) and methyl 3-methoxy-5-benzyloxycarbonyl-6-oxo-12-ethoxycarbonyldodeca-2-enoate (VIII)

To 100 ml. of dry benzene are added 16.166 g. of benzyl 3-oxo-9-ethoxycarbonylnonanoate and 1.1 g. of granulated metallic sodium and the mixture is stirred at room temperature overnight. To the mixture is added 9 g. of methyl 4-bromo-3-methoxy-2-butenoate and the mixture is refluxed for 4.25 hours. After completion of the reaction, the reaction mixture is cooled and washed successively with a dilute sulfuric acid solution and water and dried over anhydrous sodium sulfate. The solvent is distilled off and the residues are subjected to column chromatography using 200g. of neutral alumina (Grade III, Woelm co.) and eluted successively with some amount of hexane~a hexane solution containing 8 percent benzene and next with a hexane solution containing 10 percent benzene. The eluates with the hexane solution containing 10 percent benzene are collected and the solvent is distilled off to give 1.548g. of 2-methoxy-2-methoxycarbonylmethyl-4-benzyloxycarbonyl-5-(6-ethoxycarbonylhexyl)-2,3-dihydrofuran as oil. The elution with a hexane solution containing 10 percent benzene is further continued to give 1.623g. of a mixture of 2-methoxy-2-methoxycarbonylmethyl-4-benzyloxycarbonyl-5-(6-ethoxycarbonylhexyl)-2,3-dihydrofuran and methyl 3-methoxy-5-benzyloxycarbonyl-6-oxo-12-ethoxycarbonyldodeca-2-enoate as oil. Furthermore the elution with a hexane solution containing 10~20 percent benzene is continued to give 6.975g. of methyl 3-methoxy-5-benzyloxycarbonyl-6-oxo-12-ethoxycarbonyldodeca-2-enoate as oil.

2-Methoxy-2-methoxycarbonylmethyl-4-benzyloxycarbonyl-5-(6-ethoxycarbonylhexyl)-2,3-dihydrofuran
I.R. (liquid film) ν max$^{cm^{-1}}$ : 1645, 1700, 1738.
N.M.R. (CDCl$_3$) τ : ppm.
2.64 (5H, singlet, C$_6$H$_5$-)
4.83 (2H, singlet, C$_6$H$_5$CH$_2$OCO-)
5.88 (2H, quartette, CH$_3$CH$_2$OCO-)
6.32 (3H, singlet, CH$_3$OCO-)
6.70 (3H, singlet, CH$_3$O-)
8.76 (3H, triplet, CH$_3$CH$_2$OCO-)

Methyl 3-methoxy-5-benzyloxycarbonyl-6-oxo-12-ethoxycarbonyldodeca-2-enoate
I.R. (liquid film) ν max$^{cm^{-1}}$ : 1630, 1712, 1741.
N.M.R. (CDCl$_3$) τ : ppm
2.67 (5H, singlet, C$_6$H$_5$-)
4.82 (2H, singlet, C$_6$H$_5$CH$_2$OCO-)

4.95 (1H, singlet, CH$_3$OCOC=C—CH$_2$—) 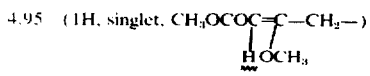

6.33 (3H, singlet, CH$_3$OCO-)
6.50 (3H, singlet, CH$_3$O-)

PREPARATION 3

Methyl 3,6-dioxo-5-benzyloxycarbonyl-12-ethoxycarbonyldodecanoate (IX)

In 5 ml. of chloroform is dissolved 105 mg. of methyl 3-methoxy-5-benzyloxycarbonyl-6-oxo-12-ethoxycarbonyldodeca-2-enoate and to the solution is added 15 drops of trifluoro acetic acid and the solution is stirred at room temperature for 2 hours. After completion of the reaction, water is added to the reaction mixture. The mixture is extracted with ether. The ether layer is separated, washed with water and dried over anhydrous sodium sulfate. The solvent is distilled off to give 105 mg. of the desired product as oil.
I.R. (liquid film) ν max$^{cm^{-1}}$ : 1730, 1745.
N.M.R. (CDCl$_3$) τ : ppm
2.67 (5H, singlet, C$_6$H$_5$-)
4.85 (2H, singlet, C$_6$H$_5$CH$_2$OCO-)
5.89 (2H, quartette, CH$_3$CH$_2$OCO-)
6.30 (3H, singlet, CH$_3$OCO-)
8.78 (3H, singlet, CH$_3$CH$_2$OCO-)

PREPARATION 4

Methyl 3,6-dioxo-5-benzyloxycarbonyl-12-ethoxycarbonyldodecanoate (IX)

In 50 ml. of chloroform is dissolved 1 g. of 2-methoxy-2-methoxycarbonylmethyl-4-benzyloxycarbonyl-5-(6-ethoxycarbonylhexyl)-2,3-dihydrofuran and to the solution is added 2 ml. of trifluoroacetic acid. The solution is stirred at room temperature for 7 hours. After completion of the reaction, the reaction mixture is treated with the same procedure as in Preparation 3 to give 875 mg. of the desired product as oil. The infrared absorption spectrum and nuclear magnetic resonance spectrum of the product are the same as those of the product obtained in Preparation 3.

PREPARATION 5

2-Methoxycarbonyl-3-(6-ethoxycarbonylhexyl)-4-benzyloxycarbonylcyclopentenone (X)

In 20 ml. of absolute methanol is dissolved 505 mg. of methyl 3,6-dioxo-5-benzyloxycarbonyl-12-ethoxycarbonyldodecanote and to the solution is added 400 mg. of potassium bicarbonate. The mixture is stirred at room temperature for 2 hours under heating at intervals. After completion of the reaction, the reaction mixture is diluted with water and made acidic by addition of acetic acid and extracted with ether. The extract is washed with water and dried over anhydrous sodium sulfate. The solvent is distilled off from the extract. The residues are subjected to column chromatography using 5 g. of silica gel and eluted with some amount of benzene and next successively with benzene~a benzene solution containing 1 percent ether. The eluates with benzene~a benzene solution containing 1 percent ether are collected and the solvent is distilled off to give 280 mg. of the desired product as oil.
I.R. (liquid film) ν max$^{cm^{-1}}$ : 700, 750, 1630, 1735, 3300~3500.
N.M.R. (CDCl$_3$) τ : ppm.
2.67 (5H, C$_6$H$_5$-)

4.80 (2H, 

5.87 (2H, CH$_3$CH$_2$OCO-)
6.16 (3H, CH$_3$OCO-)
8.75 (3H, CH$_3$CH$_2$OCO-)

PREPARATION 6

2-Methoxycarbonyl-3-(6-ethoxycarbonylhexyl)-4-benzyloxycarbonylcyclopentenone (X)

To a mixture of 0.34 g. of granulated metallic sodium and 20 ml. of 1,2-dimethoxyethane is added dropwise 5 g. of benzyl 3-oxo-9-ethoxycarbonylnonanoate at room temperature. After the metallic sodium is dissolved, 1.4 g. of methyl γ-bromoacetoacetate in 10 ml. of 1,2-dimethoxyethane is added dropwise to the solution. The mixture is stirred at room temperature for 3 hours. After completion of the reaction, 100 ml. of ice water is added to the reaction mixture. The mixture is extracted with hexane-ether (1:1) to remove the unreacted starting material. To the aqueous layer is added 10 percent hydrochloric acid under ice-cooling to adjust to pH 3 and the aqueous layer is extracted with ethyl acetate. The extract is washed with water and dried over anhydrous sodium sulfate and the solvent is distilled off to give 2.161 g. of the desired product as oil.

The infrared absorption spectrum and nuclear magnetic resonance spectrum of the product are the same as those of the product obtained in Preparation 5.

PREPARATION 7

2β-Methoxycarbonyl-3α-(6-ethoxycarbonylhexyl)-4α-carboxycyclopentanone (XII)

In 40 ml. of methanol is dissolved 249 mg. of 2-methoxycarbonyl-3-(6-ethoxycarbonylhexyl)-4-benzyloxycarbonylcyclopentenone and to the solution is added 300 mg. of 5 percent palladium on charcoal. The mixture is subjected to catalytic reduction. The reduction is completed when approximately 25 ml. of hydrogen gas is absorbed. After completion of the reaction, the catalyst is removed from the reaction mixture and the solvent is distilled off. The residues are subjected to column chromatography using 4 g. of silica gel washed with an acid and eluted successively with some amount of benzene~a benzene solution containing 2 percent ether and next with a benzene solution containing 5 percent ether. The eluates with the benzene solution containing 5 percent ether are collected and the solvent is distilled off to give 127 mg. of the desired product as oil.

I.R. (liquid film) $\nu\,max^{cm^{-1}}$: 1700, 1740, 1750, 3200 (broad).
N.M.R. (CDCl$_3$) τ: ppm.
2.06 (1H, singlet, -COOH)
5.88 (2H, quartette, CH$_3$CH$_2$OCO-)
6.23 (3H, singlet, CH$_3$OCO-)
8.74 (3H, triplet, CH$_3$CH$_2$OCO-)

PREPARATION 8

1α-Hydroxy-2β-methoxycarbonyl-3α-(6-ethoxycarbonylhexyl)-4α-carboxycyclopentane (XIII)

In a mixture of 30 ml. of ethanol and 7.5 ml. of water is dissolved 1.221 g. of 2β-methoxycarbonyl-3α-(6-ethoxycarbonylhexyl)-4α-carboxycyclopentanone and to the solution is added 880 mg. of sodium bicarbonate. To the mixture is added 400 mg. of sodium boron hydride under ice-cooling and the mixture is left to stand for 15 minutes. After completion of the reaction, water and subsequently a small amount of acetic acid are added to the reaction mixture in order to decompose the excess sodium boron hydride. The mixture is made acidic by addition of concentrated hydrochloric acid and extracted with ether. The extract is washed with water and dried over anhydrous sodium sulfate. The solvent is distilled off. The residues thus obtained are subjected to column chromatography using 12 g. of silica gel washed with an acid and eluted with some amount of benzene and next successively with a benzene solution containing 10~20 percent ether. The eluates with the benzene solution containing 10~20 percent ether are collected and the solvent is distilled off to give 730 mg. of the desired product as oil.

I.R. (liquid film) $\nu\,max^{cm^{-1}}$: 1715, 1742, 3250, 3480.
N.M.R. (CDCl$_3$) τ: ppm.
3.28 (2H, broad singlet, -COOH and -OH)
5.58 (1H, singlet, 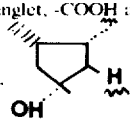 )

-Continued 5.85 (2H, quartette, CH$_3$CH$_2$OCO-)
6.24 (3H, singlet, CH$_3$OCO-)
8.72 (3H, triplet, CH$_3$CH$_2$OCO-)
Mass spectrum M⊕ - H$_2$O : 326.

PREPARATION 9

1α-Acetoxy-2β-methoxycarbonyl-3α-(6-ethoxycarbonylhexyl)-4α-carboxycyclopentane (XIV)

In 4 ml. of pyridine is dissolved 652 mg. of 1α-hydroxy-2β-methoxycarbonyl-3α-(6-ethoxycarbonylhexyl)-4α-carboxycyclopentane and to the solution is added 2 ml. of anhydrous acetic acid. The mixture is left to stand for 10 hours at 0°C and subsequently for 3 hours at room temperature after addition of water. The reaction mixture is diluted with water, made acidic by addition of dilute hydrochloric acid and extracted with ether. The extract is washed with water and dried over anhydrous sodium sulfate and the solvent is distilled off. The residues are subjected to column chromatography using 7 g. of silica gel and eluted with some amount of benzene and next successively with a benzene solution containing 1~5 percent ether. The eluates with the benzene solution containing 1~5 percent ether are collected and the solvent is distilled off to give 590 mg. of the desired product as oil.

I.R. (liquid film) $\nu\,max^{cm^{-1}}$: 1720, 1750, 3250 (broad)
N.M.R. (CDCl$_3$) τ : ppm
1.48 (1H, broad singlet, -COOH)

4.71 (1H, multiplet, 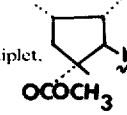 )

5.85 (2H, quartette, CH$_3$CH$_2$OCO-)
6.27 (3H, singlet, CH$_3$OCO-)
7.95 (3H, singlet, CH$_3$COO-)
8.73 (3H, singlet, CH$_3$CH$_2$OCO-)

PREPARATION 10

1α-Acetoxy-2β-methoxycarbonyl-3α-(6-ethoxycarbonylhexyl)-4α-chlorocarbonylcyclopentane (XV)

In 10 ml. of benzene is dissolved 550 mg. of 1α-acetoxy-2β-methoxycarbonyl-3α-(6-ethoxycarbonylhexyl)-4α-carboxycyclopentane and to the solution is added 3 ml. of oxalyl chloride. The mixture is refluxed for 3 hours and, after addition of 5 ml. of oxalyl chloride, left to stand overnight at room temperature. After completion of the reaction, the solvent and an excess of the reagent are distilled off from the reaction mixture to give the desired product as oil. The product thus obtained may be employed without purification in the next reaction.

PREPARATION 11

11α-Acetoxy-2β-methoxycarbonyl-3α-(6-ethoxycarbonylhexyl)-4α-acetylcyclopentane (XVI)

To a dimethyl cuprous lithium ether solution prepared by adding 13.24 ml. of a 0.8 M solution of methyl lithium in ether to a solution of 1.018 g. of cuprous iodide in 15 ml. of ether, is added dropwise at −78°C a solution of the 1α-acetoxy-2β-methoxycarbonyl-3α-(6-ethoxycarbonylhexyl)-4α-chlorocarbonylcyclopentane obtained in Preparation 10 dissolved in 5 ml. of ether. After completion of the addition, the reaction mixture is left to stand for 20 minutes, diluted with 5 ml. of methanol at −78°C and neutralized by addition of aqueous acetic acid. The mixture is extracted with ether at 0°C. The extract is washed with water and dried over anhydrous sodium sulfate and the solvent is distilled off. The residues are subjected to column chromatography using 10 g. of silica gel and eluted with some amount of benzene and next successively with a benzene solution containing 1~5 percent ether. The eluates with the benzene solution containing 1~5 percent ether are collected and the solvent is distilled off to give 330 mg. of the desired product as oil.

I.R. (liquid film) ν max$^{cm-1}$: 1720, 1745
N.M.R. (CDCl$_3$) τ : ppm

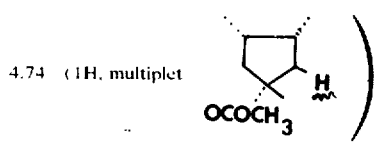

4.74 (1H, multiplet, 5.86 (2H, quartette, C<u>H</u>$_3$C<u>H</u>$_2$OCO-)
6.30 (3H, singlet, C<u>H</u>$_3$OCO-)
7.85 (3H, singlet, C<u>H</u>$_3$CO-)
7.95 (3H, singlet, C<u>H</u>$_3$COO-)
8.76 (3H, triplet, C<u>H</u>$_3$CH$_2$OCO-)

PREPARATION 12

1α,4α-Diacetoxy-2β-methoxycarbonyl-3α-(6-ethoxycarbonylhexyl) cyclopentane (XVII)

To a solution of 309 mg. of 1α-acetoxy-2β-methylcarbonyl-3α-(6-ethoxycarbonylhexyl)-4α-acetylcyclopentane and 1.85 g. of disodium hydrogenphosphate in 5 ml. of methylene chloride is added dropwise under ice-cooling a methylene chloride solution of pertrifluoroacetic acid prepared by 0.135 ml. of 90 percent hydrogen peroxide, 3 ml. of methylene chloride and 0.85 ml. of anhydrous trifluoroacetic acid. After completion of the addition, the mixture is stirred at room temperature for 45 minutes. After completion of the reaction, the reaction mixture is diluted with water and extracted with ether. The extract is washed successively with water, aqueous sodium iodide, aqueous sodium thiosulfate and water and dried over anhydrous sodium sulfate. The solvent is distilled off to give 312 mg. of the desired product as oil.

I.R. (liquid film) τ max$^{cm-1}$: 1235, 1735
N.M.R. (CDCl$_3$) ν : ppm

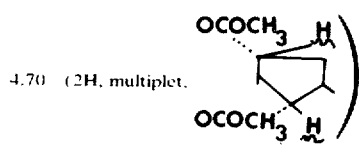

4.70 (2H, multiplet, 5.80 (2H, quartette, C<u>H</u>$_3$C<u>H</u>$_2$OCO-)
6.22 (3H, singlet, C<u>H</u>$_3$OCO-)
7.89 (3H, singlet, C<u>H</u>$_3$OCO-)
7.91 (3H, singlet, C<u>H</u>$_3$COO-)
8.69 (3H, singlet, C<u>H</u>$_3$CH$_2$OCO-)

PREPARATION 13

1α,4α-Dihydroxy-2β-methoxycarbonyl-3α-(6-ethoxycarbonylhexyl) cyclopentane (XVIII)

To a solution of 4.151 g. of 1α,4α-diacetoxy-2β-methoxycarbonyl-3α(6-ethoxycarbonylhexyl) cyclopentane in 100 ml. of absolute ethanol is added 7.5 g. of potassium carbonate and the mixture is stirred at 45°C for 1 hour. After completion of the reaction, acetic acid is added to the reaction mixture and the solvent is distilled off. The residues are extracted with ether and the solvent is distilled off from the extract. The residues are subjected to column chromatography using 35 g. of silicia gel and eluted with successively some amount of benzene~a benzene solution containing 18 percent ether and next successively with a benzene solution containing 20~30 percent ether. The eluates with the benzene solution containing 20~30 percent ether are collected and the solvent is distilled off to give 1.264 g. of the desired product as oil.

I.R. (liquid film) ν max$^{cm-1}$ 1735, 3450
N.M.R. (CDCl$_3$) τ : ppm

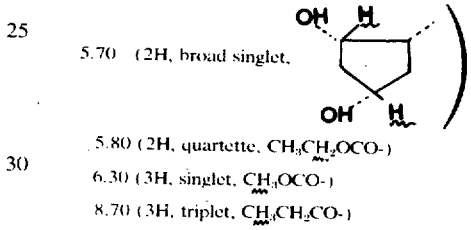

5.70 (2H, broad singlet, 5.80 (2H, quartette, C<u>H</u>$_3$C<u>H</u>$_2$OCO-)
6.30 (3H, singlet, C<u>H</u>$_3$OCO-)
8.70 (3H, triplet, C<u>H</u>$_3$CH$_2$CO-)

PREPARATION 14

1α,4α-Di(2-tetrahydropyranyloxy)-2β-methoxycarbonyl-3α-(6-ethoxycarbonylhexyl) cyclopentane (XIX)

In 6 ml. of benzene is dissolved 1.429 g. of 1α,4α-dihdyroxy-2β-methoxycarbonyl-3α-(6-ethoxycarbonylethyl) cyclopentane and to the solution is added 5 ml. of dihydropyran and a small amount of picric acid. The mixture is left to stand for 11 hours under ice-cooling and subsequently at −15°C overnight. After completion of the reaction the solvent is distilled off from the reaction mixture. The residues are subjected to column chromatography using 10 g. of neutral alumina (Grade III, Woelm Co.) and eluted with benzene. The eluates are collected and the solvent is distilled off to give 2.192 g. of the desired product as oil.

I.R. (liquid film) ν max$^{cm-1}$: 1020, 1735
N.M.R. (CDCl$_3$) τ : ppm

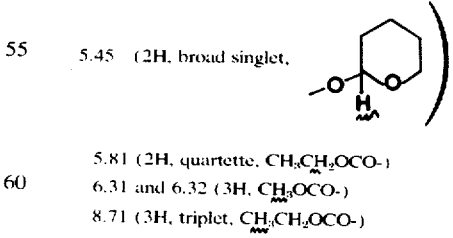

5.45 (2H, broad singlet, 5.81 (2H, quartette, C<u>H</u>$_3$C<u>H</u>$_2$OCO-)
6.31 and 6.32 (3H, C<u>H</u>$_3$OCO-)
8.71 (3H, triplet, C<u>H</u>$_3$C<u>H</u>$_2$OCO-)

PREPARATION 15

1α,4α-Di(2-tetrahydropyranyloxy)-2β-hydroxy methyl-3α-(6-ethoxycarbonylhexyl) cyclopentane (II)

To a solution of 635 mg. of 1α,4α-di(2- tetrahydropyranyloxy)-2β-methoxycarbonyl-3α-(6-ethoxycarbonylhexyl) cyclopentane in 10 ml. of absolute ethanol is added 1.2 g. of sodium boron hydride and the mixture is stirred at 0°C for 25 hours. After completion of the reaction, a small amount of acetic acid is added to the reaction mixture in order to decompose the excess of sodium boron hydride. The mixture is diluted with water and extracted with ether. The extract is washed with water and dried over anhydrous sodium sulfate. The solvent is distilled off from the extract. The residues are subjected to column chromatography using 12 g. of neutral alumina (Grade III, Wolem co.) and eluted successively with some amount of hexane~a hexane solution containing 40 percent benzene and next successively with a hexane solution containing 40~60 percent benzene. The eluates with the hexane solution containing 40~60 percent benzene are collected and the solvent is distilled off to give 140 mg. of the starting material. The elution is continued using successively benzene~a benzene solution containing 30 percent ethyl acetate to give 149 mg. of the desired product as oil.

I.R. (liquid film) ν max$^{cm-1}$ : 1742, 3470
N.M.R. (CDCl$_3$) τ : ppm

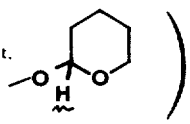

5.30 (2H, broad singlet, 5.80 (2H, quartette, CH$_3$C$\underline{H}_2$OCO-)
8.71 (3H, triplet, C$\underline{H}_3$CH$_2$OCO-)

PREPARATION 16

1α,4α-Di(2-tetrahydropyranyloxy)-2β-methoxycarbonyl-3α-(6-carboxyhexyl) cyclopentane (XX)

In 70 ml. of 30 percent aqueous methanol containing 5 percent potassium carbonate is dissolved 3 g. of 1α,4-α-di(2-tetrahydropyranyloxy)-2β-methoxycarbonyl-3α-(6-ethoxycarbonylhexyl) cyclopentane and the solution is stirred at room temperature for 4 hours. After completion of the reaction, the reaction mixture is diluted with water and hexane is added to the mixture. The hexane layer is separated and washed with water and dried over anhydrous sodium sulfate. The solvent is distilled off to give 1.521 g. of the starting material. The aqueous layer is made acidic by addition of acetic acid and extracted with ethyl acetate. The extract is washed with water and dried. The solvent is distilled off to give 1.432 g. of the desired product as oil.

I.R. (liquid film) ν max$^{cm-1}$ : 1698, 1724
N.M.R. (CDCl$_3$) τ : ppm

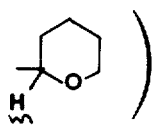

5.30 (2H, broad singlet, 6.32 (3H, singlet, C$\underline{H}_3$OCO-)

PREPARATION 17

1α,4α-Di(2-tetrahydropyranyloxy)-2β-hydroxymethyl-3α-(6-carboxyhexyl) cyclopentane (II)

In 100 ml. of anhydrous tetrahydrofuran is dissolved the potassium salt prepared from 1.4 g. of 1α,4α-di(2-tetrahydropyranyloxy)-2β-methoxycarbonyl-3α-(6-carboxyhexyl) cyclopentane and 330 mg. of potassium bicarbonate and, after addition of 1.4 g. of lithium boron hydride, the mixture is refluxed for 15 hours. After completion of the reaction, ice water and subsequently a samll amount of dilute hydrochloric acid are added to the reaction mixture to decompose the excess of lithium boron hydride. The mixture is extracted with ether. The extract is washed with water and dried over anhydrous sodium sulfate and the solvent is distilled off. The residues are subjected to column chromatography using 7 g. of silica gel and eluted some amount of hexane and next successively with benzene~a benzene solution containing 30 percent ethyl acetate. The eluates with the benzene solution containing 30 percent ethyl acetate are collected and the solvent is distilled off to give 995 mg. of the desired product as oil.

I.R. (liquid film) ν max$^{cm-1}$ : 1700, 3300~3400
N.M.R. (CDCl$_3$) τ : ppm.

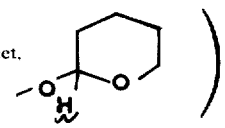

5.30 (2H, broad singlet,

PREPARATION 18

Preparation of prostaglandin F1α from 1α,4α-di(2-tetrahydropyranyloxy)-2β-formyl-3α-(6-ethoxycarbonylhexyl) cyclopentane (I).

9α,11α,15α-Trihydroxyprost-13 (trans)-epoic acid (prostaglandin F1α)

1. To a solution of 123 mg. of 1α,4α-di(2-tetrahydropyranyloxy)-2β-formyl-3α-(6-ethoxycarbonylhexyl) cyclopentane in 5 ml. of ether is added a solution of 168 mg. of tri-n-butylphosphin-2-oxoheptylide in 1.5 ml. of ether and the mixture is stirred at room temperature for 17 hours. After completion of the reaction, the solvent is distilled off from the reaction mixture. The residues are subjected to column chromatography using 3 g. of neutral alumina (Grade III, Wolem co.) and eluted successively with some amount of hexane~a hexane solution containing 8 percent benzene and next with a hexane solution containing 10 percent benzene. The eluates with the latter solvent are collected and the solvent is distilled off to give oils. The oils are further subjected to column chromatography using 3 g. of silica gel and eluted with some amount of benzene and next successively with a benzene solution containing 1~5 percent ether. The eluates with the benzene solution containing 1~5 percent ether are collected and the solvent is distilled off to give 138 mg. of ethyl 9α,11α-di(2-tetrahydropyranyloxy)-15-oxoprost-13(trans)-enoate.

I.R. (liquid film) νcm⁻max$^{cm-1}$ : 1632, 1670, 1695, 1740
N.M.R. (CDCl$_3$) τ : ppm.

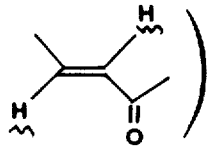

2.8~4.2 (2H, multiplet, 5.39 (2H, broad singlet, 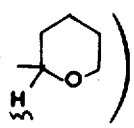

2. To a solution of 270 mg. of ethyl 9α,11α-di(2-tetrahydropyranyloxy)-15-oxoprost-13(trans)-enoate in 20 ml. of methanol is added 500 mg. of sodium boron hydride under ice-cooling and the mixture is stirred at 0°C for 1 hour. After completion of the reaction, ice water and subsequently acetic acid are added to the reaction mixture to decompose the excess of sodium boron hydride. The mixture is extracted with ether and the extract is washed with water and dried over anhydrous sodium sulfate. The solvent is distilled off from the extract. The residues are subjected to column chromatography using 4.5 g. of silica gel and eluted successively with some amount of benzene~a benzene solution containing 3 percent ether and next successively with a benzene solution containing 5 percent ether~ethyl ether. The eluates with the benzene solution containing 5 percent ether~ethyl acetate are collected and the solvent is distilled off to give 144 mg. of ethyl 9α,11α-di(2-tetrahydropyranyloxy)-15-hydroxyprost-13 (trans)-enoate.

I.R. (liquid film) ν max^(cm-1) : 970 (trans double bond), 3470
N.M.R. (CDCl₃) τ : ppm.

4.40 (2H, multiplet, 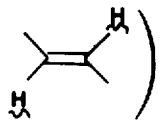

3. In a mixture of 1 ml. of tetrahydrofuran, 10 ml. of acetic acid and 5 ml. of water is dissolved 124 mg. of ethyl 9α,11α-di(2-tetrahydropyranyloxy)-15-hydroxyprost-13(trans)-enoate and the solution is stirred at 30°~40°C for 2 hours. After completion of the reaction, the reaction mixture is diluted with water and extracted with ethyl acetate-ether (1:1). The extract is washed with water and dried over anhydrous sodium sulfate and the solvent is distilled off to give 110 mg. of oils. The oils are subjected to column chromatography using 2 g. of silica gel and eluted successively with some amount of benzene~a benzene solution of 10 percent ethyl acetate and next successively with a benzene solution containing 20~30 percent ethyl acetate. The eluates with the benzene solution containing 20~30 percent ethyl acetate are collected and the solution is distilled off to give 20 mg. of ethyl 9α,11α,15β-trihydroprost-b 13(trans)-enoate as oil. The elution is continued using successively a benzene solution containing 30~40 percent ethyl acetate to give 50 mg. of a mixture of ethyl 9α,11α,15β-trihydroxyprost-13(trans)-enoate and ethyl 9α,11α,15α-trihydroxyprost-13(trans)-enoate as oil. The elution is further continued using successively a benzene solution containing 60~80 percent ethyl acetate to give 28 mg. of ethyl 9α,11α,15α-trihydroxyprost-13(trans)-enoate as oil.

Ethyl 9α,11α,15β-trihydroxyprost-13(trans)-enoate

I.R. (CHCl₃) ν max^(cm-1) : 970 (transdouble bond), 1730, 3400
N.M.R. (CDCl₃) τ : ppm.

4.42 (2H, multiplet 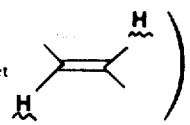

5.80 (2H, broad singlet, 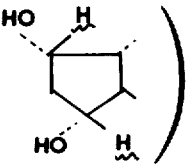

5.81 (2H, quartette, CH₃CH₂OCO-)
8.73 (3H, triplet, CH₃CH₂OCO-)

Ethyl 9α,11α,15α-trihydroxyprost-13(trans)-enoate

I.R. (CHCl₃) ν max^(cm-1) : 970 (trans double bond), 1730, 3400
N.M.R. (CDCl₃) τ : ppm.

4.58 (2H, multiplet 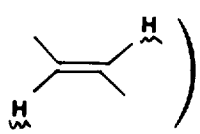

5.80 (2H, quartette, CH₃CH₂OCO-)

5.90 (2H, broad singlet, 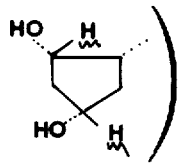

8.73 (3H, triplet, CH₃CH₂OCO-)
mass spectrum M⊕ - H₂O:352

4. In 5 ml. of 30 percent aqueous methanol containing 2 percent potassium hydroxide is dissolved 60 mg. of ethyl 9α,11α,15α-trihydroxyprost-13(trans)-enoate and the solution is stirred at room temperature and subsequently at 50°C for 3 hours. After completion of the reaction, a small amount of acetic acid is added to the reaction mixture and the solvent is distilled off under reduced pressure. The residues are dissolved in ethyl acetate-ether (1:1) and washed with a small amount of water and the solvent is distilled off. To the residues is added an ether-hexane solution to crystallize. The crude crystals are recrystallized from ethyl acetate-hexane to give 23 mg. of pure 9α,11α,15α-trihydroxyprost-13(trans)-enoic acid (prostaglandin F1α) melting at 78°~79.5°C.

I.R. (melt) ν max^(cm-1) : 960 (trans double bond), 1710, 3350
N.M.R. (CDCl₃) τ : ppm.

4.55 (2H, multiplet), 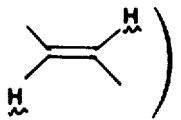

-Continued 6.00 (3H, broad singlet, 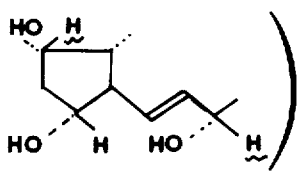

mass spectrum M+ -H₂O:338

EXAMPLE

1α,4α-Di(2-tetrahydropyranyloxy)-2β-formyl-3α-(6-ethoxycarbonylhexyl) cyclopentane (1)

To a solution of 140 mg. of 1α,4α-di(2-tetrahydropyranyloxy)-2β-hydroxymethyl-3α-(6-ethoxycarbonylhexyl) cyclopentane in 25 ml. of methylene chloride is added 2.5 g. of anhydrous chromic acid-pyridine complex under ice-cooling and the mixture is stirred for 15 minutes. After completion of the reaction, the reaction mixture is extracted with ether. The extract is washed with water and dried over anhydrous sodium sulfate. The solvent is distilled off to give 123 mg. of the desired product as oil.

I.R. (liquid film) $\nu$ max$^{cm^{-1}}$ : 1740, 2715

The absorption caused by the hydroxy group was not observed.

What is claimed is:

1. 2-Hydroxymethylcyclopentane derivative having the formula

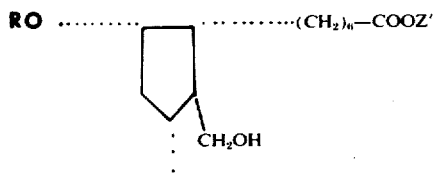

wherein Z' represents a hydrogen atom or an alkyl group having 1 to 6 carbon atoms and R represents a tetrahydropyranyl group.

2. A compound of claim 1 comprising 1α,4α-Di(2-tetrahydropyranyloxy)-2β-hydroxymethyl-3α-(6-ethoxycarbonylhexyl)cyclopentane.

3. A compound of claim 1 comprising 1α,4α-Di(2-tetrahydropyranyloxy)-2β-hydroxymethyl-3α-(6-carboxyhexyl)cyclopentane.

* * * * *

UNITED STATES PATENT AND TRADEMARK OFFICE
CERTIFICATE OF CORRECTION

PATENT NO. : 3,910,965
DATED : October 7, 1975
INVENTOR(S) : KIYOSHI SAKAI et al It is certified that error appears in the above-identified patent and that said Letters Patent are hereby corrected as shown below:

Abstract, last line: replace "Fα" with --- $F_{1\alpha}$ ---.

Column 2, lines 49-50: replace "would have" with -- would not have --.

Column 5, lines 1-2: replace "same above" with -- same as above --.

Column 5, line 2: replace "cyano/group" with -- cyano group --.

Column 7, lines 60-61: replace "e.g. acetate" with -- e.g. ethyl acetate --.

Column 10, line 43: before "an organic acid", insert -- and --.

Column 11, line 21: replace "ethano" with -- ethanol --.

Column 12, line 59: replace "$CH_2CH_2OCO-$" with -- $CH_3CH_2OCO-$ --.

Column 18, line 39: replace "dihdyroxy" with -- dihydroxy --.

Column 21, line 60: "trihydroprost-b" should be replaced by -- trihydroxyprost- --.

UNITED STATES PATENT AND TRADEMARK OFFICE
CERTIFICATE OF CORRECTION

PATENT NO. : 3,910,965
DATED : October 7, 1975
INVENTOR(S) : KIYOSHI SAKAI et al It is certified that error appears in the above-identified patent and that said Letters Patent are hereby corrected as shown below:

Column 2, lines 42-43: "sulfornamide" should be replaced with -- sulfonamide --.

Column 6, line 4: replace "hydroaides" with -- hydroides --.

Column 9, line 16: replace "triphenylphosphin" with -- triphenylphosphine --.

Column 9, line 18: replace "etheres" with -- ethers --.

Column 11, line 23: replace "demethylformamide" with -- dimethylformamide --.

Column 11, line 55: replace "isomes" with -- isomers --.

Signed and Sealed this eighth Day of June 1976

[SEAL]

Attest:

RUTH C. MASON
Attesting Officer

C. MARSHALL DANN
Commissioner of Patents and Trademarks